(12) United States Patent
Sato et al.

(10) Patent No.: US 9,908,429 B2
(45) Date of Patent: Mar. 6, 2018

(54) BATTERY CONTROL UNIT SYSTEM

(71) Applicant: KABUSHIKI KAISHA TOYOTA JIDOSHOKKI, Aichi (JP)

(72) Inventors: Kimihiro Sato, Kariya (JP); Satoshi Yamamoto, Kariya (JP); Takahiro Tsuzuku, Kariya (JP); Ryusuke Hase, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 9 days.

(21) Appl. No.: 14/916,367

(22) PCT Filed: Jun. 20, 2014

(86) PCT No.: PCT/JP2014/066409
§ 371 (c)(1),
(2) Date: Mar. 3, 2016

(87) PCT Pub. No.: WO2015/040911
PCT Pub. Date: Mar. 26, 2015

(65) Prior Publication Data
US 2016/0207415 A1    Jul. 21, 2016

(30) Foreign Application Priority Data
Sep. 19, 2013    (JP) ................... 2013-194260

(51) Int. Cl.
*B60L 11/18*    (2006.01)
*B60L 3/00*    (2006.01)
(52) U.S. Cl.
CPC ......... *B60L 11/1864* (2013.01); *B60L 3/0046* (2013.01); *B60L 11/1861* (2013.01);
(Continued)

(58) Field of Classification Search
CPC .......................... G01R 31/327; Y02T 10/7038
See application file for complete search history.

(56) References Cited

U.S. PATENT DOCUMENTS 5,477,130 A     12/1995   Hashimoto et al.
5,666,040 A *   9/1997   Bourbeau ............. H01M 2/348
                                                   320/118

(Continued)

FOREIGN PATENT DOCUMENTS

JP            7-29554         1/1995
JP           10-257604        9/1998
(Continued)

OTHER PUBLICATIONS

International Search Report in PCT/JP2014/066409, dated Sep. 2, 2014.

*Primary Examiner* — Alex C Dunn
(74) *Attorney, Agent, or Firm* — Greenblum & Bernstein, P.L.C.

(57) ABSTRACT

A battery control unit system is provided that detects a state of a battery used for driving a vehicle and monitors the state of the battery on the basis of detected information so as to control a circuit device surrounding the battery according to a result of the monitoring. The battery control unit system may include an internal power source that is connected directly in parallel with the battery and that supplies power to the battery control unit system, and a microcontroller that operates using the internal power source and detects, by a software process, an on/off-state of a battery pack switch that is provided in a battery pack including the battery and the battery control unit system.

11 Claims, 2 Drawing Sheets

(52) U.S. Cl.
CPC ..... *B60L 11/1866* (2013.01); *B60L 2240/545* (2013.01); *B60L 2240/547* (2013.01); *B60L 2240/549* (2013.01); *Y02T 10/7005* (2013.01); *Y02T 10/7061* (2013.01); *Y02T 10/92* (2013.01)

(56) References Cited

U.S. PATENT DOCUMENTS

| | | | | |
|---|---|---|---|---|
| 5,703,464 | A * | 12/1997 | Karunasiri | B60L 3/0046 180/65.8 |
| 5,850,134 | A * | 12/1998 | Oh | H01M 10/42 320/106 |
| 6,184,656 | B1 * | 2/2001 | Karunasiri | B60L 3/0046 180/65.8 |
| 9,190,861 | B2 * | 11/2015 | Kim | H02J 7/007 |
| 2004/0051534 | A1 * | 3/2004 | Kobayashi | G01R 19/16542 324/429 |
| 2009/0139781 | A1 * | 6/2009 | Straubel | B60L 11/1875 180/65.1 |
| 2010/0078238 | A1 * | 4/2010 | Oba | B60K 6/40 180/65.225 |
| 2010/0085020 | A1 * | 4/2010 | Suzuki | B25F 5/00 320/157 |
| 2011/0020676 | A1 * | 1/2011 | Kurosawa | B60K 1/04 429/62 |
| 2011/0111268 | A1 * | 5/2011 | Weng | H01M 10/441 429/50 |
| 2012/0100405 | A1 * | 4/2012 | Noda | H01M 10/488 429/92 |
| 2012/0268068 | A1 * | 10/2012 | Jung | H01M 10/44 320/109 |
| 2013/0127399 | A1 * | 5/2013 | Tang | B60L 1/003 320/104 |
| 2013/0229186 | A1 * | 9/2013 | Shiraishi | G01R 31/327 324/415 |
| 2014/0111139 | A1 * | 4/2014 | Chen | H01F 27/28 320/107 |
| 2015/0136504 | A1 | 5/2015 | Tsujimura et al. | |
| 2015/0355285 | A1 | 12/2015 | Nishigaki et al. | |
| 2015/0369871 | A1 | 12/2015 | Nishigaki et al. | |

FOREIGN PATENT DOCUMENTS

| | | |
|---|---|---|
| JP | 10-285826 | 10/1998 |
| JP | 2002-300731 | 10/2002 |
| JP | 2007-189760 | 7/2007 |
| JP | 2011-108439 | 6/2011 |
| JP | 2012-240476 | 12/2012 |

* cited by examiner

BATTERY CONTROL UNIT SYSTEM

TECHNICAL FIELD

The present invention relates to a battery control unit system that detects a state of a battery used for driving a vehicle and monitors the state of the battery on the basis of the detected information by use of calculation, so as to control a circuit device surrounding the battery according to a result of the monitoring.

RELATED ART

A battery control unit system is provided that detects, for example, voltage, current, and a temperature of a battery used for driving a vehicle and monitors, for example, a charge/discharge state and an abnormal/normal state of the battery on the basis of the detected information by use of calculation, so as to control, according to a result of the monitoring, a circuit device surrounding the battery such as a battery disconnection switch and a circuit that equalizes the voltage of each cell, the battery disconnection switch using, for example, a relay to connect the battery to or to disconnect the battery from a feed line. Further, the battery control unit system has a communication function to communicate with an electronic control unit such as a vehicle control unit that monitors and controls an operating state of the vehicle.

In general, the battery control unit system is also called a battery ECU (electronic control unit), and is constituted of several microcontrollers. A certain microcontroller has a function to perform, for example, a voltage monitoring, a current monitoring, and a temperature monitoring of a battery, and another microcomputer has a function to perform, for example, a self-diagnosis on the battery control unit system itself, a system monitoring, and CAN (controller area network) communication with an electronic control unit such as a vehicle control unit.

FIG. 2 is a diagram that illustrates an exemplary connection arrangement in a conventional battery control unit (hereinafter also referred to as a "battery ECU") system. A battery ECU system 1 is included in a battery pack 10 along with a battery 3 and a battery disconnection switch 4. The battery pack 10 is provided with a battery pack switch 2 that is manually set to be on when the battery 3 is used.

An internal power source 5 of the battery ECU system 1 is connected to the battery 3 through the battery pack switch 2, and the battery ECU system 1 operates using the internal power source 5 supplied with power by the battery 3 through the battery pack switch 2. When the battery pack switch 2 is set to be on, the battery ECU system 1 starts a monitoring-and-control operation, and then turns on the battery disconnection switch 4 so as to place, into a conductive state, a feed line that connects the battery 3 to a load circuit of the vehicle 20.

With respect to the battery 3, in general, a cell stack in which a plurality of cells are connected to one another in series is used, and further, an assembled battery in which a plurality of cell stacks are connected to one another in parallel is used. When the battery pack switch 2 is turned on, the battery ECU system 1 starts operating by being charged by the battery 3, detects, for example, voltage, current, and a temperature of each cell included in the battery 3 using a sensor (not shown), and monitors, for example, a charge/discharge state and an abnormal/normal state of the battery 3, so as to control the state of the battery 3 appropriately.

Further, when starting its operation, the battery ECU system 1 communicates information with an electronic control unit such as a vehicle control unit mounted in the vehicle 20 through a communication line 6 for CAN communication, wherein the battery ECU system 1 transmits, to the vehicle 20, information based on a state of the battery 3 and receives, from the vehicle 20, information on an operating state of the vehicle 20 such as a traveling state.

In the connection arrangement in the battery ECU system 1 in FIG. 2, when the battery pack switch 2 is manipulated to be turned off, the current supply to the battery ECU system 1 is stopped and the whole operation of the battery ECU system 1 is stopped, and accordingly, the battery disconnection switch 4 is turned off and the feed line that connects the battery 3 to the load circuit of the vehicle 20 is interrupted. It is not possible to maintain the monitoring-and-control operation of the battery ECU system 1 in a state in which the battery pack switch 2 is off.

With respect to this matter, for example, Patent Document 1 below discloses a configuration in which, in a power control device of a vehicle that is provided with a plurality of electronic control units (ECUs), when an ignition key is turned off, operations of some of the electronic control units (ECUs) are maintained by an auxiliary battery such that a state of a part of the vehicle can be monitored.

CITATION LIST

Patent Document

Patent Document 1: Japanese Laid-open Patent Publication No. 2007-189760

SUMMARY OF INVENTION

Technical Problem

According to the exemplary connection arrangement in the conventional battery ECU system 1 in FIG. 2, the battery pack switch 2 is inserted into a connection path between the battery 3 that supplies current to the battery ECU system 1 and the battery ECU system 1, and the connection path between the battery ECU system 1 and the battery 3 is physically placed into a conductive state or is disconnected by the battery pack switch 2.

In such an exemplary connection arrangement, when the battery pack switch 2 is turned off, the current supply to the battery ECU system 1 is stopped and the whole monitoring-and-control operation of the battery ECU system 1 is stopped, and accordingly, the battery disconnection switch 4 that connects the battery 3 to the load circuit of the vehicle 20 is turned off.

Thus, when there occurs an abnormality in which the battery pack switch 2 is turned off while the vehicle 20 is traveling, the connection between the battery 3 and the load circuit of the vehicle 20 is suddenly disconnected because the battery disconnection switch 4 is turned off, which results in failure in an appropriate operation of the vehicle 20.

In light of the problem described above, an object of the present invention is to provide a battery control unit system that is included in a battery pack 10 and that permits a battery ECU system 1 to maintain its monitoring-and-control operation without using an auxiliary battery even if a battery pack switch 2 that is set to be on when a battery 3 is used is turned off.

Solution to Problem

Means for Solving the Problems

A battery control unit system according to an aspect of the present invention detects a state of a battery used for driving a vehicle and monitors the state of the battery on the basis of the detected information by use of calculation, so as to control a circuit device surrounding the battery according to a result of the monitoring, the battery control unit system including an internal power source that is connected directly in parallel with the battery and that supplies power to the battery control unit system, and a microcontroller that operates using the internal power source and detects, by a software process, an on/off-state of a battery pack switch that is provided in a battery pack including the battery and the battery control unit system.

Advantageous Effects of Invention

According to embodiments of the present invention, an internal power source is provided that is connected directly in parallel with a battery and that supplies power to a battery control unit system, which permits a battery ECU system to maintain its monitoring-and-control operation without using an auxiliary battery even if a battery pack switch is turned off. Further, an on/off-state of the battery pack switch is detected by a software process of a microcontroller, which makes it possible to control the battery ECU system to operate in any operational mode according to the on/off-state of the battery pack switch.

DESCRIPTION OF EMBODIMENTS

Figure 1:
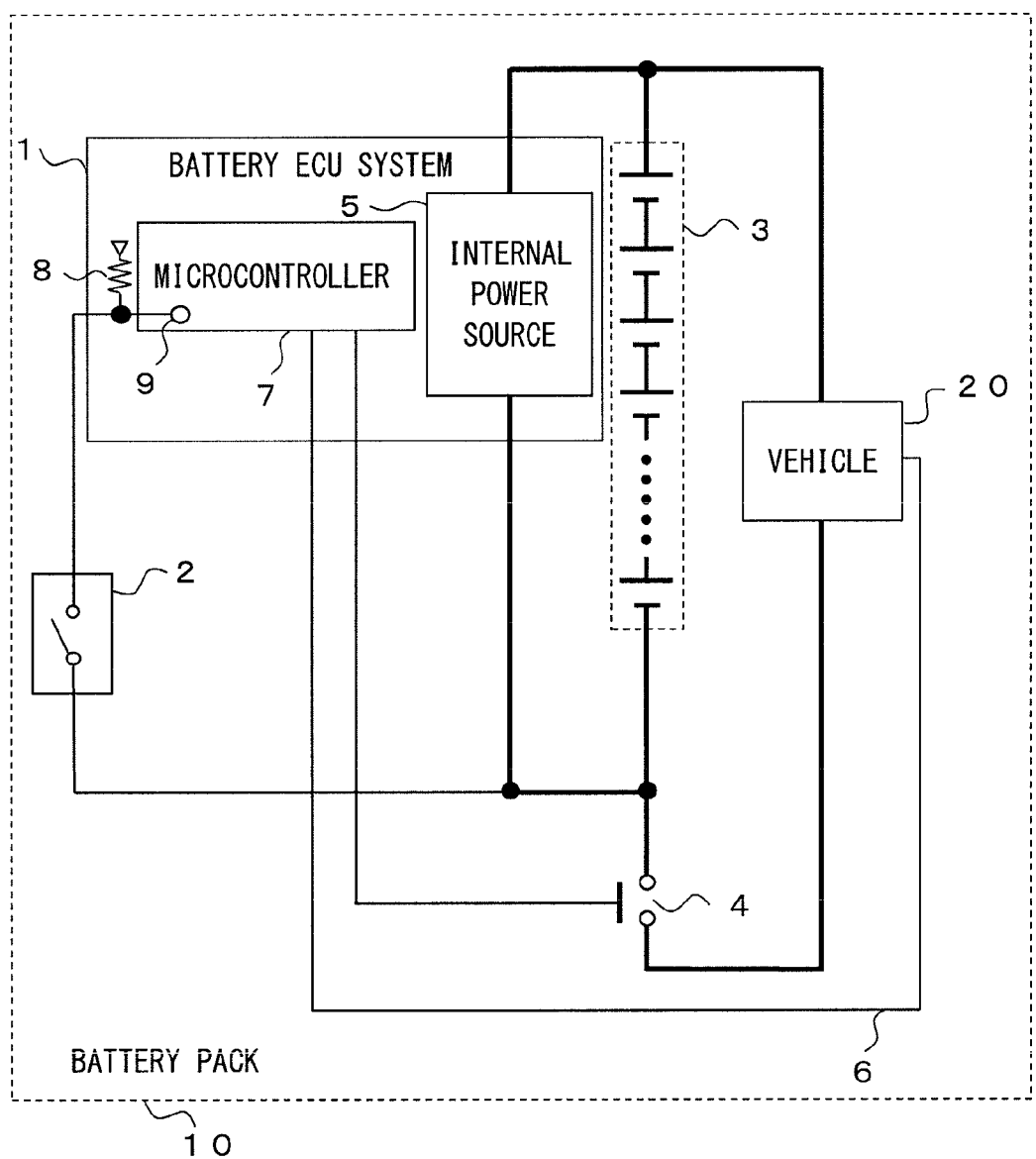
FIG. 1 is a diagram that illustrates an exemplary connection arrangement in a battery ECU system according to an embodiment of the present invention.
Figure 2:
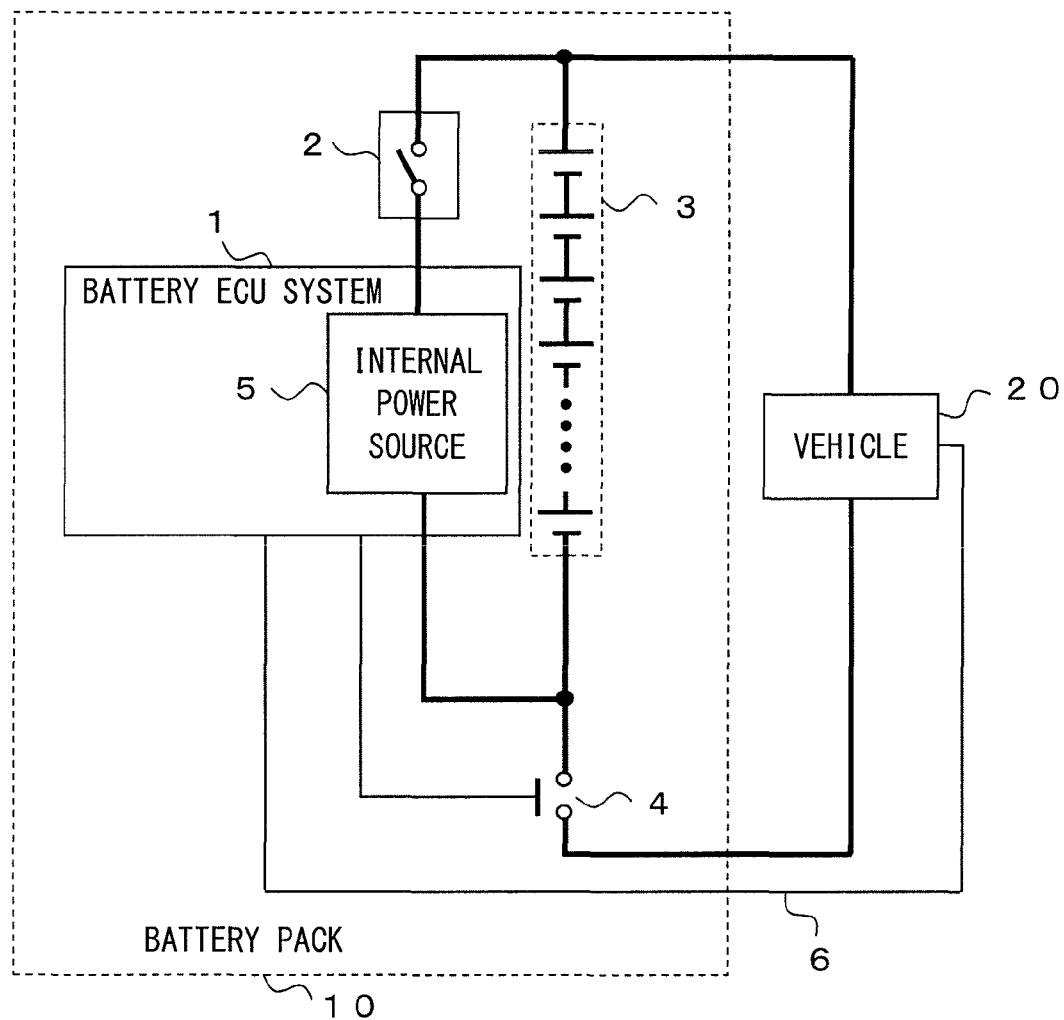
FIG. 2 is a diagram that illustrates an exemplary connection arrangement in a conventional battery control unit system.

Embodiments of the present invention will now be described with reference to the drawings. FIG. 1 is a diagram that illustrates an exemplary connection arrangement in a battery ECU system according to an embodiment of the present invention. References in FIG. 1 identical to those in FIG. 2 denote the same components. As illustrated in FIG. 1, an internal power source 5 of a battery ECU system 1 is connected directly in parallel with a battery 3. The battery ECU system 1 operates by being supplied with power by the internal power source 5.

The battery ECU system 1 includes a microcontroller 7, and the microcontroller 7 detects an on/off-state of a battery pack switch 2 by a software process. The battery pack switch 2 is a manual switch that is provided in a battery pack 10, and is set to be on when the battery 3 is used. The battery pack 10 includes the battery 3, the battery ECU system 1, and a battery disconnection switch 4.

One end of the battery pack switch 2 is connected to a negative terminal of the battery 3 (a ground potential), and another end is connected to a positive potential of the internal power source 5 through resistance 8 (a pullup) and also connected to an input terminal 9 of the microcontroller 7.

When the battery pack switch 2 is off, a high-level potential pulled up to a positive potential through the resistance 8 is input into the input terminal 9 of the microcontroller 7, and on the other hand, when the battery pack switch 2 is on, a low-level potential of the negative terminal of the battery 3 (a ground potential) is input into the input terminal 9 of the microcontroller 7. Thus, the microcontroller 7 monitors the level of the input terminal 9, and detects, by a software process, that the battery pack switch 2 is off when the level is high and that the battery pack switch 2 is on when the level is low.

When the on-state of the battery pack switch 2 is detected by the microcontroller 7, the battery ECU system 1, as is conventional, detects, for example, voltage, current, and a temperature of each cell included in the battery 3 using a sensor (not shown) and monitors, for example, a charge/discharge state and an abnormal/normal state of the battery 3, so as to control the state of the battery 3 appropriately.

Further, the battery ECU system 1 communicates information with an electronic control unit such as a vehicle control unit mounted in a vehicle 20 through a communication line 6 for CAN communication, wherein the battery ECU system 1 transmits, to the vehicle 20, information based on a state of the battery 3 and receives, from the vehicle 20, information on an operating state of the vehicle 20 such as a traveling state.

On the other hand, even when the battery pack switch 2 is turned off, the battery ECU system 1 is operable by being supplied with power by the internal power source 5 that is connected directly in parallel with the battery 3, and when the off-state of the battery pack switch 2 is detected by the microcontroller 7, the battery ECU system 1 can operate in any operational mode different from when the battery pack switch 2 is on, while maintaining the operation of the battery ECU system 1.

As an example of an operational mode when the battery pack switch 2 is off, a low-power-consumption mode, such as an operational mode in which only some of the microcontrollers in the battery ECU system 1 are operated for performing only a portion of the monitoring-and-control operation of the battery ECU system 1 or an operational mode in which the monitoring and control of the battery ECU system 1 is intermittently performed, can be adopted.

Further, the monitoring-and-control operation of the battery ECU system 1 can be maintained even when the battery pack switch 2 is off, so it is possible to appropriately control, using a determination operation in the battery ECU system 1, on the basis of the information on an operating state of the vehicle 20, the battery disconnection switch 4 that connects the battery 3 to a load circuit of the vehicle 20, without, as is conventional, disconnecting the battery disconnection switch 4 with no exception when the battery pack switch 2 is off.

In other words, according to the conventional connection arrangement, the on/off-state of the battery disconnection switch 4 is always linked to the on/off-state of the battery pack switch 2, and even if the vehicle 20 is traveling, the battery disconnection switch 4 is turned off when the battery pack switch 2 is turned off due to, for example, trouble, which results in failing in an appropriate operation of the vehicle 20.

On the other hand, according to the connection arrangement of the present embodiment that is illustrated in FIG. 1, even when the battery pack switch 2 is turned off due to, for example, erroneous manipulation or abnormality, the battery ECU system 1 is able to appropriately determine and control the on/off-state of the battery disconnection switch 4 according to the traveling state of the vehicle 20, on the basis of the information on an operating state of the vehicle 20 such as a traveling state, which is obtained by use of CAN communication.

Thus, when there occurs an abnormality in which the battery pack switch 2 is turned off while the vehicle 20 is traveling, the battery ECU system 1 tentatively controls, on the basis of the information on an operating state of the vehicle 20, the battery disconnection switch 4 to remain on, and while performing the control, the battery ECU system 1 transmits, to a user, through the communication line 6 for CAN communication, a report that urges him/her to execute evacuation running, which permits the user to, for example, execute, according to the report, evacuation running on the vehicle 20 supplied with power by the battery 3.

The embodiment of the present invention has been described above, but the present invention is not limited to the embodiment described above, and various modifications and alterations may be made thereto without departing from the spirit and scope of the invention.

REFERENCE SIGNS LIST 1 battery ECU system
2 switch
3 battery
4 switch element
5 internal power source
6 communication line for CAN communication
7 microcontroller
8 resistance
9 input terminal
10 battery pack
20 vehicle

The invention claimed is:

1. A battery control system that detects a state of a battery used for driving a vehicle and monitors the state of the battery on the basis of the detected information by use of calculation, so as to control a circuit device surrounding the battery according to a result of the monitoring, the battery control system comprising:
an internal power source that is connected directly in parallel with the battery, which used for driving a vehicle, without any switch intervention,
wherein the internal power source is supplied with power from the battery, and
wherein the internal power source supplies power to the battery control system; and
a microcontroller that operates using the internal power source and detects, by a software process, an on/off-state of a battery pack switch that is provided in a battery pack including the battery and the battery control system, all components of the battery pack switch being located along a path distinct from the direct parallel connection between the battery and the internal power source.

2. The battery control system according to claim 1, wherein the microcontroller controls the battery control system to operate in a low-power-consumption mode when detecting the off-state of the battery pack switch.

3. The battery control system according to claim 1, wherein the microcontroller controls, on the basis of information on an operating state of the vehicle, a battery disconnection switch to remain on when detecting the off-state of the battery pack switch, the battery disconnection switch being provided in a feed line that connects the battery to the vehicle.

4. The battery control system according to claim 1, wherein the microcontroller detects the on/off-state of the battery pack switch according to whether a potential that is input into an input terminal of the microcontroller is a high-level potential or a low-level potential.

5. The battery control system according to claim 1, wherein the battery pack switch is connected to a pullup resistor and an input terminal of the microcontroller.

6. The battery control system according to claim 1, wherein the internal power source supplies power to the battery control system even when the battery pack switch is turned off.

7. The battery control system according to claim 2, wherein in a low-power-consumption mode, only some of a plurality of microcontrollers of the battery control system are operated, only a portion of monitoring-and-control operation of the battery control system is performed, or monitoring and control of the battery control system is intermittently performed.

8. The battery control system according to claim 3, wherein while controlling the battery disconnection switch to remain on, the battery control system transmits, through a communication line to a user, a report that urges the user to perform an evacuation operation.

9. The battery control system according to claim 1, wherein when the battery pack switch is in the on state, the vehicle is driven by the battery.

10. The battery control system according to claim 1, wherein one end of the battery pack switch is connected to the battery and another end of the battery pack switch is connected to an input terminal of the microcontroller.

11. The battery control system according to claim 1, wherein the on/off state of the battery pack switch is independent of a connection of the battery and the vehicle.

* * * * *

UNITED STATES PATENT AND TRADEMARK OFFICE
CERTIFICATE OF CORRECTION

PATENT NO. : 9,908,429 B2
APPLICATION NO. : 14/916367
DATED : March 6, 2018
INVENTOR(S) : Kimihiro Sato et al.

Page 1 of 1

It is certified that error appears in the above-identified patent and that said Letters Patent is hereby corrected as shown below:

In the Claims

In Column 5, Line 43 (Claim 1, Line 8) the expression "which used" should read -- which is used --.

Signed and Sealed this
Thirtieth Day of October, 2018

Andrei Iancu
*Director of the United States Patent and Trademark Office*